(12) United States Patent
Wang et al.

(10) Patent No.: US 8,325,405 B2
(45) Date of Patent: Dec. 4, 2012

(54) VIBRATION-ACTUATED MICRO MIRROR DEVICE

(75) Inventors: Yu-Jen Wang, Taipei County (TW);
Chien-Shien Yeh, Tainan County (TW);
Chung-De Chen, Miaoli County (TW);
Hung-Chung Li, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/450,574

(22) Filed: Apr. 19, 2012

(65) Prior Publication Data

US 2012/0200902 A1   Aug. 9, 2012

Related U.S. Application Data

(62) Division of application No. 12/963,024, filed on Dec. 8, 2010, now Pat. No. 8,218,214.

(30) Foreign Application Priority Data

Aug. 17, 2010 (TW) ............................... 99127428 A

(51) Int. Cl.
*G02B 26/08* (2006.01)

(52) U.S. Cl. ............... 359/199.1; 359/198.1; 359/213.1; 359/214.1; 359/224.1

(58) Field of Classification Search .... 359/198.1–200.8, 359/213.1–214.1, 221.2, 223.1–226.2; 310/36, 310/40 R, 309, 311, 321
See application file for complete search history.

(56) References Cited

U.S. PATENT DOCUMENTS

| | | | |
|---|---|---|---|
| 5,579,148 A | 11/1996 | Nishikawa et al. | |
| 6,956,683 B2 | 10/2005 | Heaton et al. | |
| 6,965,177 B2 | 11/2005 | Turner et al. | |
| 6,979,418 B1 | 12/2005 | Harrington | |
| 7,377,439 B1 | 5/2008 | Merchant | |
| 7,442,918 B2 | 10/2008 | Sprague et al. | |
| 7,446,919 B2 | 11/2008 | Wood | |
| 7,659,918 B2 | 2/2010 | Turner | |
| 2008/0042052 A1 | 2/2008 | Sprague et al. | |

OTHER PUBLICATIONS

Yalcinkaya et, al., "Two-Axis Electromagnetic Microscanner for High Resolution Displays", Aug. 2006, pp. 786-794, vol. 15, Journal of Microelectromechanical Systems.
R. Maeda et, al., "Piezoelectric Microactuator Devices", 2004, Journal of Electroceramics, Kluwer Academic Publishers, Manufactured in The Netherlands.
Gruger et, al., "New Approach for MEMS Scanning Mirror for Laser Projection Systems", 2008, vol. 6887, Proc. of SPIE, Retrieved from the Internet: <URL:http://spiedl.org/terms>.

*Primary Examiner* — James Phan
(74) *Attorney, Agent, or Firm* — WPAT, P.C.; Justin King

(57) ABSTRACT

The present invention provides a vibration-actuated micro mirror device comprising a substrate having a swinging frame and a reflection mirror, and a vibration part having a first and a second vibration structures coupled to the substrate, wherein the first vibration structure is driven to generate a first complex wave formed by a first and a second wave signals while the second vibration structure is driven to generate a second complex wave formed by a third and a fourth wave signals, and the first and the third wave signals are formed with the same frequency and phase while the second and the fourth wave signals are formed with the same frequency but opposite phases. The first and the second complex waves actuate the substrate such that the swinging frame is rotated about a first axis while the reflection mirror is rotated about a second axis.

14 Claims, 10 Drawing Sheets

VIBRATION-ACTUATED MICRO MIRROR DEVICE

CROSS REFERENCE TO RELATED PATENT APPLICATION

This application is a divisional of an application Ser. No. 12/963,024, filed on Dec. 8, 2010, now U.S. Pat. No. 8,218,214.

TECHNICAL FIELD

The present disclosure relates to a micro mirror technology, and more particularly, to a vibration-actuated micro mirror device utilizing a complex wave to actuate a reflection mirror for performing a two-dimensional rotation movement.

TECHNICAL BACKGROUND

With rapidly increasing demand for micro projectors, there are more and more manufacturers that are directing their resources and funding toward the related researches in order to establishing a leading position in this promising and profitable technology. It is noted that micro projectors can be integrated into all kinds of electronic devices, such as cellular phones and notebook computers. By a modularization design of micro projector, any cellular phone can be equipped with a projector module and thus can be used in briefing easily and conveniently that is comparatively much more capable of attracting consumer interest than those without. Most micro projectors that are currently available on the market are flat in appearance, and consequently, all the components used in micro projectors are designed solely for reducing the thickness of the micro projectors, by that not only the flat and thin micro projectors can be portable, but also can be easily integrated with other products.

One of the key issues for producing a good micro projector is to have a refection mirror that can be driven to rotate within a large angular range and at high rotation frequency. For a XGA projector displaying a resolution of 800 pixels by 600 pixels to achieve 30 frames per second, its fast axis must be capable operating at 18 kHz or higher, and the faster the better. Conventionally, there are three different methods for actuating reflection mirrors in micro projectors, which are an electromagnetic-actuated method, an electrostatic-actuated method and a piezoelectric-actuated method, and accordingly, the reflection mirror should be configured differently in corresponding to the way it is being actuated.

In U.S. Pat. No. 7,442,918, a micro-electro-mechanical system (MEMS) device is disclosed, which utilizes a MEMS process for electroplating double layer planar coils simultaneously on its mirror and out ring relating respectively to the fast scan axis and the slow scan axis so as to enable the fast and the slow scan axes to be actuated by the Lorentz force induced from the interaction between the coils and the permanent magnets disposed at two opposite sides thereof as soon as the coils are charged. Moreover, in U.S. Pat. No. 7,659,918, a single-axis scanning device is disclosed, in which a reflection mirror that is disposed in the middle of the device is actuated to pivotally oscillate or rotate by the use of a piezoelectric material, or by the vibration induced surrounding the reflection mirror. In addition, there is another single-axis scanning device disclosed in U.S. Pat. No. 7,446,919, in that there are four piezoelectric elements being used for actuating a reflection mirror to rotate as the reflection mirror is disposed in the middle of the device.

TECHNICAL SUMMARY

The present disclosure related to a high-frequency vibration-actuated micro mirror device with ultra-thin and low-power design, which utilizes two complex electric signals, each composed of signals of two different frequencies, to actuate two vibration structures in respective. Thereby, the two vibration structures, being actuated by the two complex electric signals, are enabled to generate respectively two complex waves of different wave signals that are to be transmitted to a substrate configured with a fast-axis mirror and a slow-axis mirror for enabling the a swinging frame and a reflection mirror to resonant and thus to rotate accordingly. Since the pivotally oscillating of the slow-axis mirror can be induced by low-frequency wave signals while the pivotally oscillating of the fast-axis mirror can be induced by high-frequency wave signals, a two-dimensional scanning operation can be achieved by the swinging frame and reflection mirror that are being actuated to rotate and thus a specific projection effect can be achieved.

In an exemplary embodiment, the present disclosure provides a vibration-actuated micro mirror device, comprising: a substrate configured with a swinging frame and a reflection mirror; and a vibration part, configured with a fixing plate, a first vibration structure and a second vibration structure in a manner that the first and the second vibration structures are disposed respectively on the fixing plate while being coupled to the substrate; wherein, the first vibration structure has ability to receive a first driving signal so as to generate a first complex wave formed by a first wave signal and a second wave signal; and the second vibration structure has ability to receive a second driving signal to generate a second complex wave formed by a third wave signal and a fourth wave signal; wherein, the first wave signal and the third wave signal are formed with a same first frequency while the second wave signal and the fourth wave signal are formed with a same second frequency, and the first and the second complex waves actuate the substrate for enabling the swinging frame to rotate about a first axis while enabling the reflection mirror to rotate about a second axis.

In another exemplary embodiment, the present disclosure provides a vibration-actuated micro mirror device, comprising: a substrate, configured with a swinging frame and a reflection mirror while being formed with a slot; and a vibration part, configured with a first vibration structure and a second vibration structure in a manner that the first and the second vibration structures are disposed on the substrate respectively at two sides of the slot; wherein, the first vibration structure has ability to receive a first driving signal so as to generate a first complex wave formed by a first wave signal and a second wave signal; and the second vibration structure has ability to receive a second driving signal to generate a second complex wave formed by a third wave signal and a fourth wave signal; wherein, the first wave signal and the third wave signal are formed with a same first frequency while the second wave signal and the fourth wave signal are formed with a same second frequency, and the first and the second complex waves actuate the substrate for enabling the swinging frame to rotate about a first axis while enabling the reflection mirror to rotate about a second axis.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
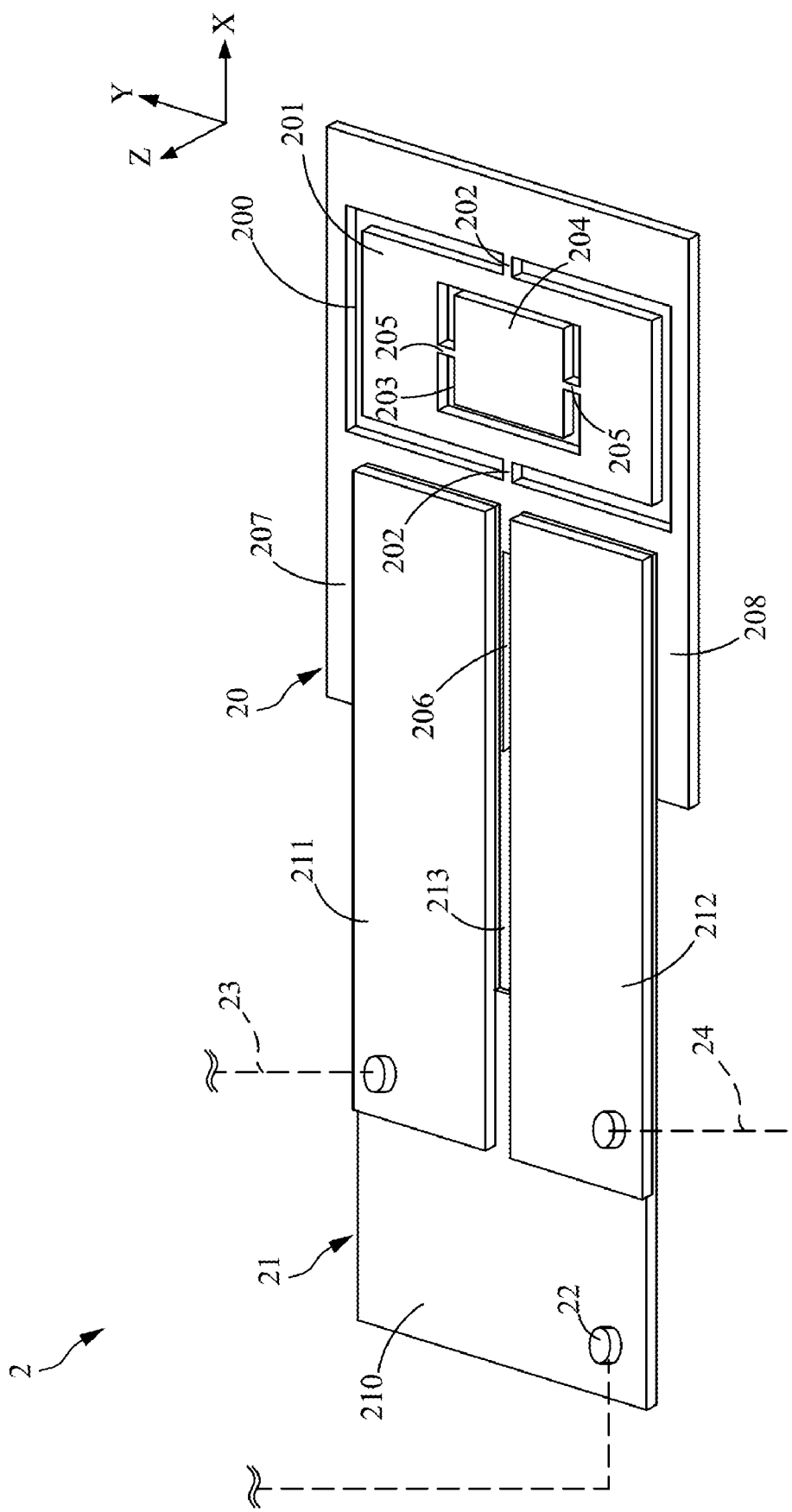
FIG. 1 is a schematic diagram showing a vibration-actuated micro mirror device according to a first embodiment of the present disclosure.

Please refer to FIG. 1, which is a schematic diagram showing a vibration-actuated micro mirror device according to a first embodiment of the present disclosure. In this embodiment, a vibration-actuated micro mirror device 2 includes a substrate 20 and a vibration part 21, in which the substrate 20 is formed with a first opening 200 to be used for receiving a swinging frame 201. As shown in FIG. 1, the swinging frame 201 has a first axis 202, being a shaft formed on the swinging frame 201 while protruding out from two opposite sides of the swinging frame 201 by two first ends, which is connected to two opposite inner sides of the first opening 200 by the two first ends. Moreover, the swinging frame 201 is similarly formed with a second opening 203 to be used for receiving a reflection mirror 204, and also the reflection mirror 204 has a second axis 205, being a shaft formed on the reflection mirror 204 while protruding out from two opposite sides of the reflection mirror 204 by two second ends, that is connected to two opposite inner sides of the second opening 203 by the two second ends. In this embodiment, the first axis 202 is aligned in a X-axis direction and the second axis 205 is aligned in a Y-axis direction that are defined in an XYZ Cartesian coordinate system of FIG. 1.

Figure 2B:
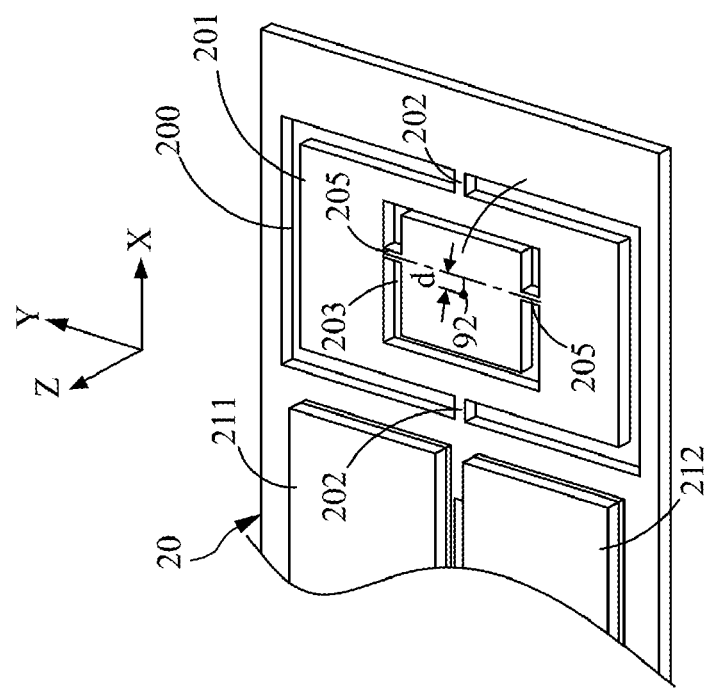
FIG. 2B is a schematic diagram showing that the pivot axis of the reflection mirror is disposed a specific distance away from part from the center of the reflection mirror according to further another embodiment of the present disclosure.
Figure 2A:
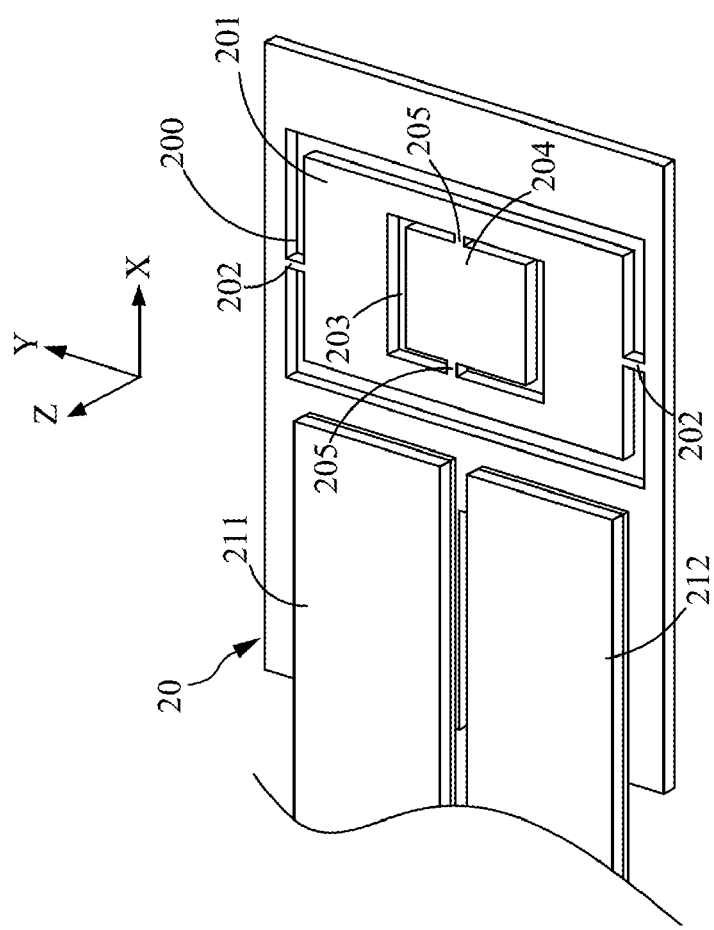
FIG. 2A is a schematic diagram showing the configurations of the pivot axes for the swinging frame and the reflection mirror according to another embodiment of the present disclosure.
Figure 3B:
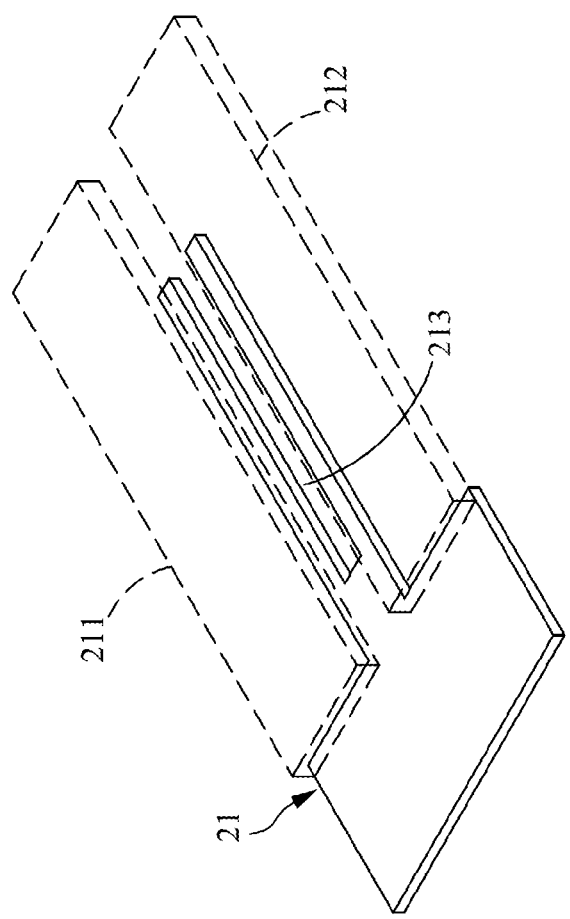
FIG. 3B is a three-dimensional view of a fixing plate used in the present disclosure.
Figure 3A:
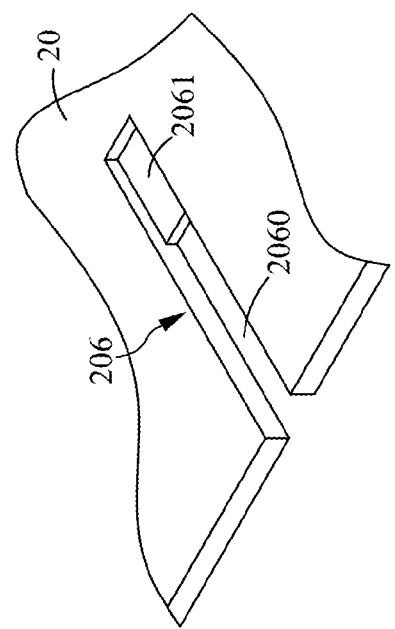
FIG. 3A is a schematic diagram showing a first slot formed on the substrate according to an embodiment of the present disclosure.

In another embodiment that is shown in FIG. 2A, the first axis 202 of the swinging frame 201 is aligned in a Y-axis direction and the second axis 205 of the reflection mirror 204 is aligned in a Y-axis direction that are defined in an XYZ Cartesian coordinate system of FIG. 2A. It is noted that in the embodiments shown in FIG. 1 and FIG. 2A, the second axis 205 is aligned passing through the center of the reflection mirror 204. However, in the embodiment shown in FIG. 12B, the second axis 205 is aligned a distance d away from the center of the reflection mirror 204. In FIG. 1, the substrate 20 is further being formed with a first slot 206 at a side of the substrate opposite to the first opening 200 that is disposed dividing the substrate 20 into a first area 207 and a second area 208. It is noted that the first slot 206 can be formed penetrating the substrate 20 in a vertical direction, i.e. in Z-axis direction, or may be a groove without penetrating the substrate 20. Moreover, as shown in FIG. 3A, the first slot 206 can be composed of a sub-slot 2060 that is formed penetrating the substrate 20, and a sub-groove 2061 that is not penetrating the substrate 20. It is noted that the first slot 206, as the one shown in FIG. 1, is not an essential component for the present disclosure that is can be formed selectively at will according to the material of the substrate 20. Nevertheless, the formation of the first slot 206 is to facilitate the energy of the vibration part 21 to be transmitted to the swinging frame 201 and the reflection mirror 204 for driving the two to rotate accordingly.

As shown in FIG. 1, the vibration part 21 comprises a fixing plate 210, a first vibration structure 211 and a second vibration structure 212, in which the first and the second vibration structures 211, 212 are respectively coupled to the fixing plate 210 by an end thereof, while enabling another ends of the first and the second vibration structures 211, 212 to be coupled to the substrate 20 through the fixing plate 210. Moreover, the first and the second vibration structures 211, 212 are coupled respectively to the first area 207 and the second area 208 that are divided and formed at two opposite sides of the slot 206. In this embodiment, the first and the second vibration structures 211, 212 are made of a piezoelectric material, so that the first and the second vibration structures 211, 212 can be driven to vibrate by the receiving of electric signals. Please refer to FIG. 3B, which is a three-dimensional view of a fixing plate used in the present disclosure. In this embodiment, for enhancing the vibration of the first and the second vibration structures 211, 212, the fixing plate 210 is further being formed with a second slot 213, by that the first and the second vibration structures 211, 212 are arranged to be disposed respectively at two opposite sides of the second slot 213. It is noted that the second slot 213 is not an essential component for the present disclosure that is can be formed selectively at will with respect to the material of the fixing plate 21.

Figure 4A:
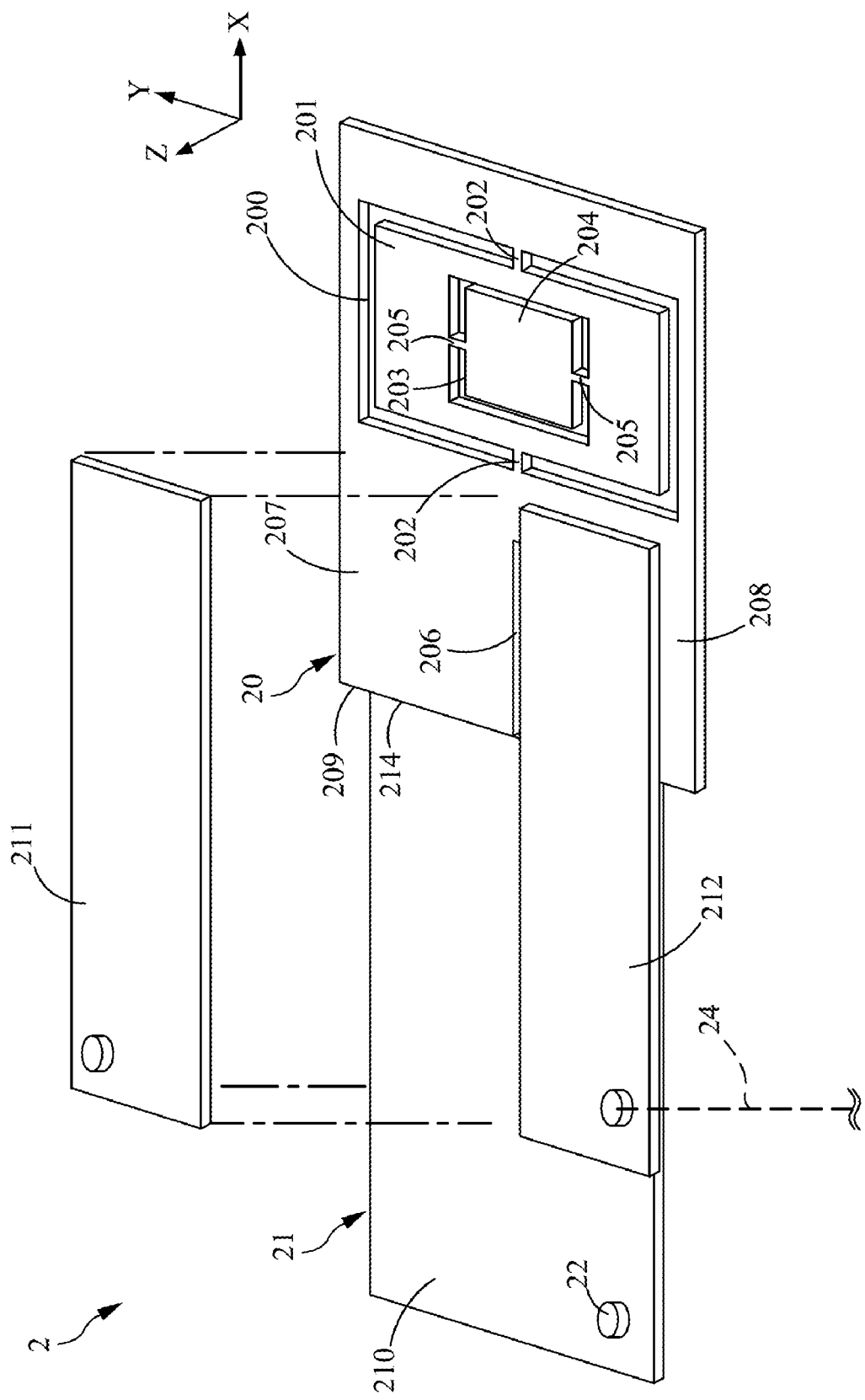
FIG. 4A and FIG. 4B are schematic diagrams showing respectively two vibration-actuated micro mirror devices according to a second embodiment and a third embodiment of the present disclosure.
Figure 4B:
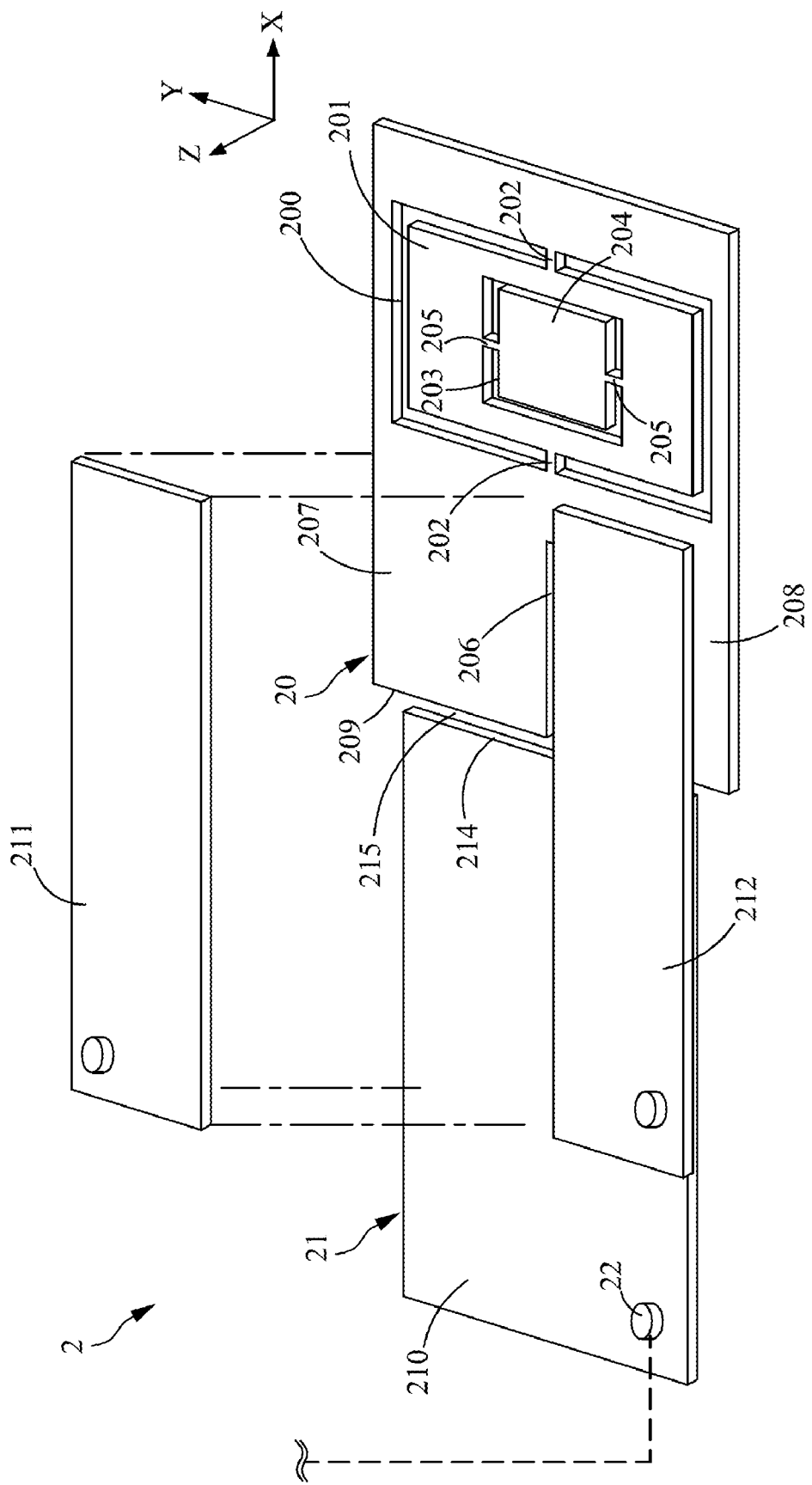

Please refer to FIG. 4A and FIG. 4B, which are schematic diagrams showing respectively two vibration-actuated micro mirror devices according to a second embodiment and a third embodiment of the present disclosure. The embodiment shown in FIG. 4A is basically the same as the one shown in FIG. 1, but is different in that: the first and the second vibration structures 211, 212 in the second embodiment are coupled directly to the substrate 20 while enabling a side surface 214 of the fixing plate 210 to abut against a side surface 209 of the substrate 20. Moreover, the embodiment shown in FIG. 4B is basically the same as the one shown in FIG. 1, but is different in that: the first and the second vibration structures 211, 212 are coupled to the substrate 20 directly while enabling a side surface 214 of the fixing plate 210 to be spaced from a side surface 209 of the substrate 20 by a gap 215. It is noted that although there is no such second slot 103 being formed on the substrates 20 in FIG. 4A and FIG. 4B as the one shown in FIG. 1, the second slot 213 can still be formed in the embodiments of FIG. 4A and FIG. 4B as required in a manner known to those skilled in the art. In addition, the same as the fixing plate 210 shown in FIG. 3B, the two divided areas of the fixing plate 210, that are disposed at two opposite sides of the second slot 213, can further be concaved before mounting the first and the second vibration structures 211, 212 respectively there on at positions corresponding to the concaved areas of the fixing plate 210.

Figure 5A:
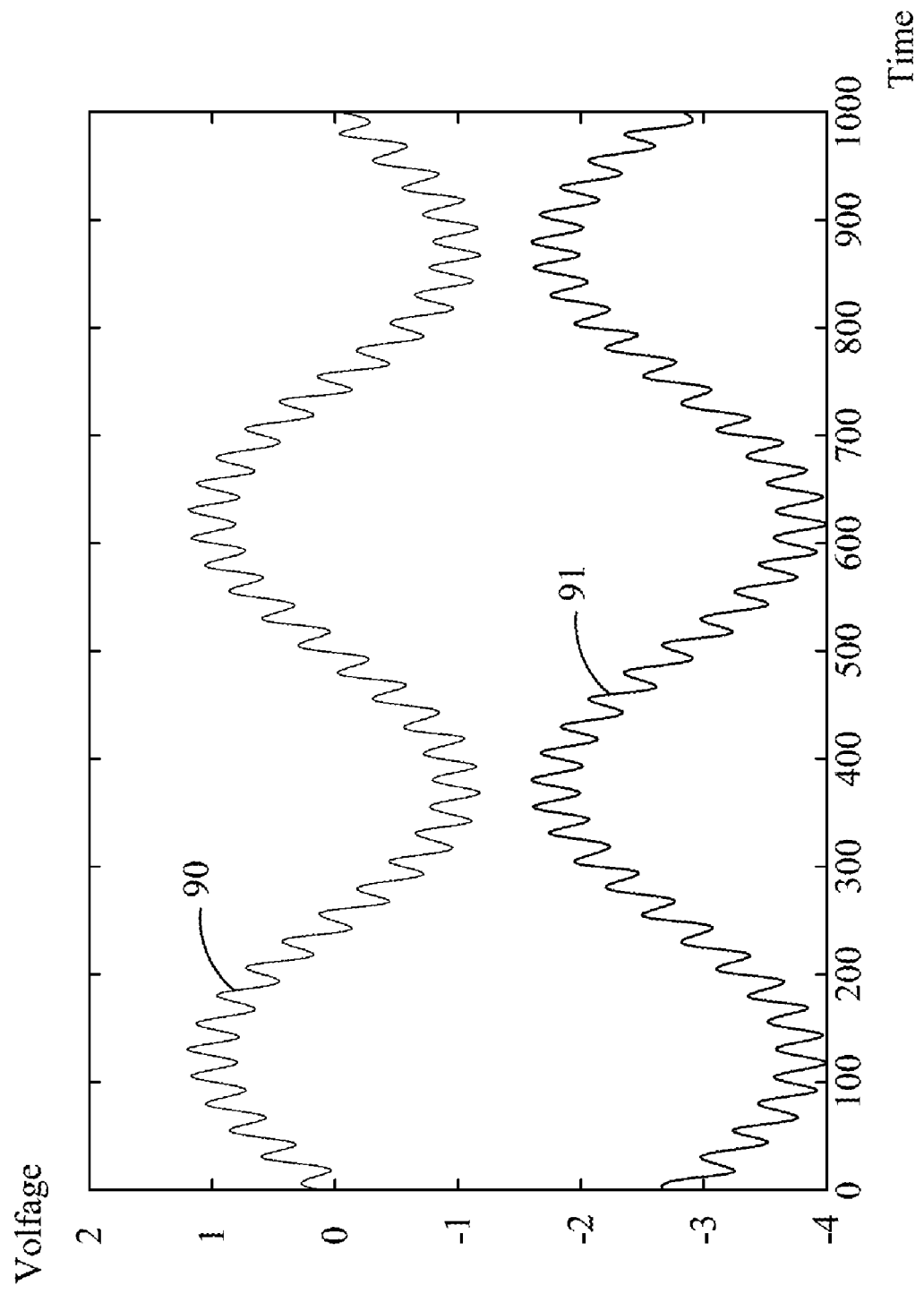
FIG. 5A is a schematic diagram showing two complex electric signals being received respectively by the first and the second vibration structures according to an embodiment of the present disclosure.

The following description relates to how the first and the second vibration structures are to be driven to vibrate in the present disclosure. In the present disclosure, the first and the second vibration structures are designed to receive two driving signals in respectively, in which the driving signal for the first vibration structure is a complex electric signal combining a high-frequency electric signal and a low-frequency signal that is generated from a frequency synthesizer, and similarly, the driving signal for the second vibration structure is another complex electric signal combining a high-frequency electric signal and a low-frequency signal that is generated from a frequency synthesizer. Please refer to FIG. 5A, which is a schematic diagram showing two complex electric signals being received respectively by the first and the second vibration structures according to an embodiment of the present disclosure. As shown in FIG. 5A, the complex electric signal 90 is used for driving the first vibration structure 211, while the complex electric signal 91 is used for driving the second vibration structure 212. It is noted that the high-frequency signals in the complex electric signals 90, and 91 are of the same phase, but the phases of the low-frequency signals in the complex electric signals 90, and 91 are opposite to each other. Moreover, the first and the second vibration structures 211, and 212 are configured to share a same grounding electrode 22, by that the amount of signal lines required can be reduced. The signal lines 23, and 24 are defined to be signal input where the complex electric signals 90, and 91 are fed respectively to the first and the second vibration structures 211, and 212 for driving the two to vibrate accordingly. It is noted that the term "high-frequency" used in the present embodiment is comparative to the term "low-frequency", so that they can be determined at will according to actual requirement. In addition to the complex electric signals shown in FIG. 5B, another complex electric signals can be used for driving the first and the second vibration structures 211, and 212, as those shown in FIG. 5B, in which the low-frequency signals in the complex electric signals are of the same phase, but the phases of the high-frequency signals in the complex electric signals are opposite to each other.

In FIG. 1, the first vibration structure 211 is driven by a first driving signal 90 so as to generate a first complex wave formed by a first and a second wave signals while the second vibration structure 212 is driven by a second driving signal 91 so as to generate a second complex wave formed by a third and a fourth wave signals. In this embodiment, the first and the second driving signals 90, and 91 are the two shown in FIG. 5A, so that the first and the third wave signals are high-frequency modes while the second and the fourth wave signals are low-frequency modes, and thus, the first and the third wave signals are formed with a same first frequency and with the same phase while the second and the fourth wave signals are formed with a same second frequency but with opposite phases. Consequently, by the driving of the complex electric signals 90, and 91 of FIG. 5A, the first and the second complex waves will actuate the substrate for enabling the swinging frame 201 to rotate about a first axis, i.e. a rotation about the slow axis, while enabling the reflection mirror 204 to rotate about a second axis, i.e. a rotation about the fast axis. It is noted that the respective first frequency of the first and the third wave signals are larger than 15 KHz, and the respective second frequency of the second and the fourth wave signals are smaller than 1.5 KHz, but are not limited thereby. In another words, although the first frequency of the foregoing embodiment is higher than the second frequency, alternatively, the first frequency is capable of being lower than the second frequency.

Figure 5B:
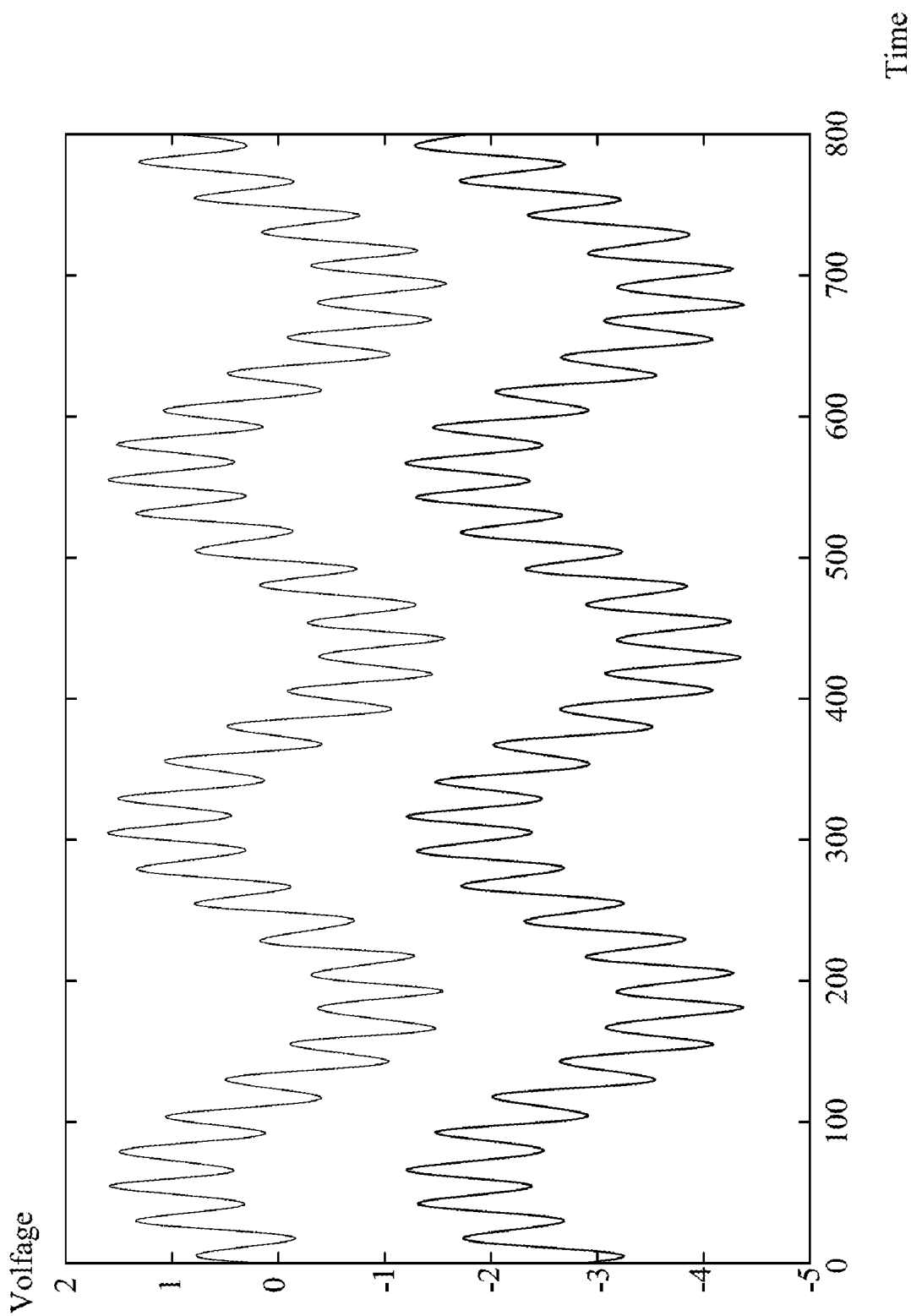
FIG. 5B a schematic diagram showing two complex electric signals being received respectively by the first and the second vibration structures according to another embodiment of the present disclosure.

On the other hand, in the foregoing embodiment, the first wave signal and the third wave signal are formed with the same phase while the second wave signal and the fourth wave signal are formed with opposite phase; however, it is noted that, in alternative embodiment, the first wave signal and the third wave signal are capable of being formed with opposite phase while the second wave signal and the fourth wave signal are formed with the same phase, which is clearly illustrated as FIG. 5B. Meanwhile, the first wave signal and the third wave signal are capable of being formed with a phase difference. In another embodiment, the second wave signal and the fourth wave signal are capable of being formed with a phase difference.

Figure 6A:
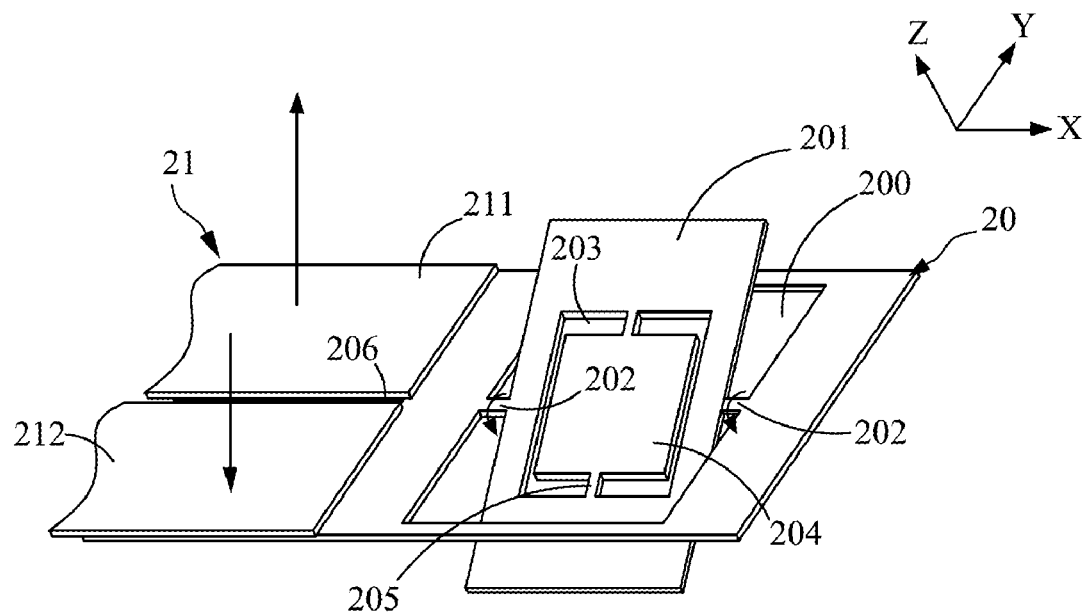
FIG. 6A and FIG. 6B are schematic diagrams showing respectively how the swinging frame and the reflection mirror are being driven to rotate.

The following description relates to how the swinging frame and reflection mirror are to be driven to rotate in the present disclosure that is illustrated by defining the first and the third wave signals are high-frequency modes while the second and the fourth wave signals are low-frequency modes, and thus the driving signals are similarly to those shown in FIG. 5A. As shown in FIG. 6A, when the second and the fourth wave signals containing in the vibrations of the first and the second vibration structures 211, 212 are transmitted to the substrate 20 that are opposite to each other in phase, the portions of the substrate 20 that are coupled respectively to the first and the second vibration structures 211, 212 that are separated by the first slot 206 will be driven to pivotally oscillating relative to each other in opposite phases, which will cause the fist axis 202 to twist, and consequently, drive the swinging frame 201 corresponding to the first axis 201 to rotate, that is, the rotation of slow axis in the present disclosure. It is noted that when the swinging frame 201 is at its resonant frequency, a larger rotation angle can be achieved.

Figure 6B:
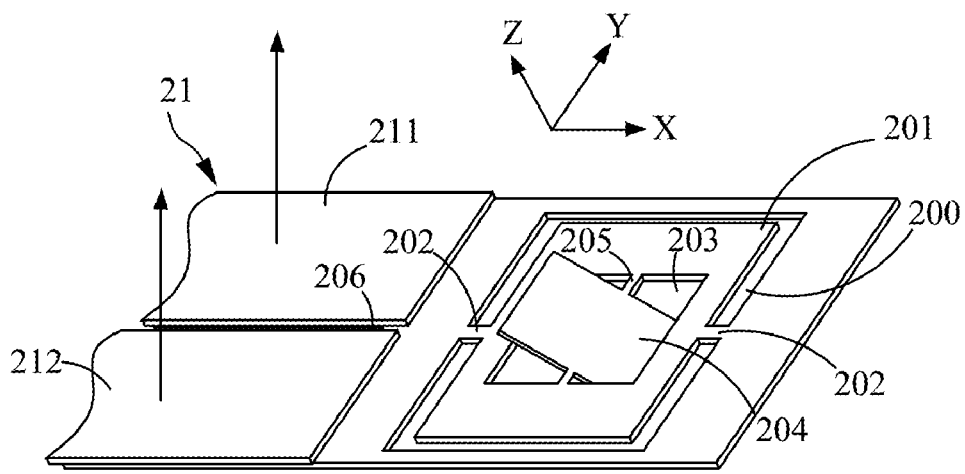

Accordingly, the twist of the second axis 205 is enabled by the contribution of the high-frequency first and the third wave signals containing in the vibrations of the first and the second vibration structures 211, 212. As shown in FIG. 6B, when the high-frequency vibrations are transmitted to the second axis 205, the second axis 206 will be caused to twist and thus driven the reflection mirror 204 corresponding to the second axis 205 to rotate, that is, the rotation of fast axis in the present disclosure. Similarly, when the reflection mirror 204 is at its resonant frequency, a larger rotation angle can be achieved. By the vibrations of the first and the second vibration structures 211, 212, the twists of the first axis 202 and the second axis 205 can be controlled and consequently, the angles of the swinging frame 201 and the reflection mirror 204 are adjusted accordingly so as to achieve a specific scanning operation. It is noted that although the fix axis 202 and the second axis 205 in both the embodiments of FIG. 6A and FIG. 6B are driven to rotate independently, they can be driven to rotate simultaneously, but in a manner that the size of their respective rotation angles as well as the angular difference between the swinging frame 201 and the reflection mirrors 204 are dependent upon their respective complex driving signals with respect to the compositions of the high-frequency modes and the low-frequency modes.

Figure 7A:
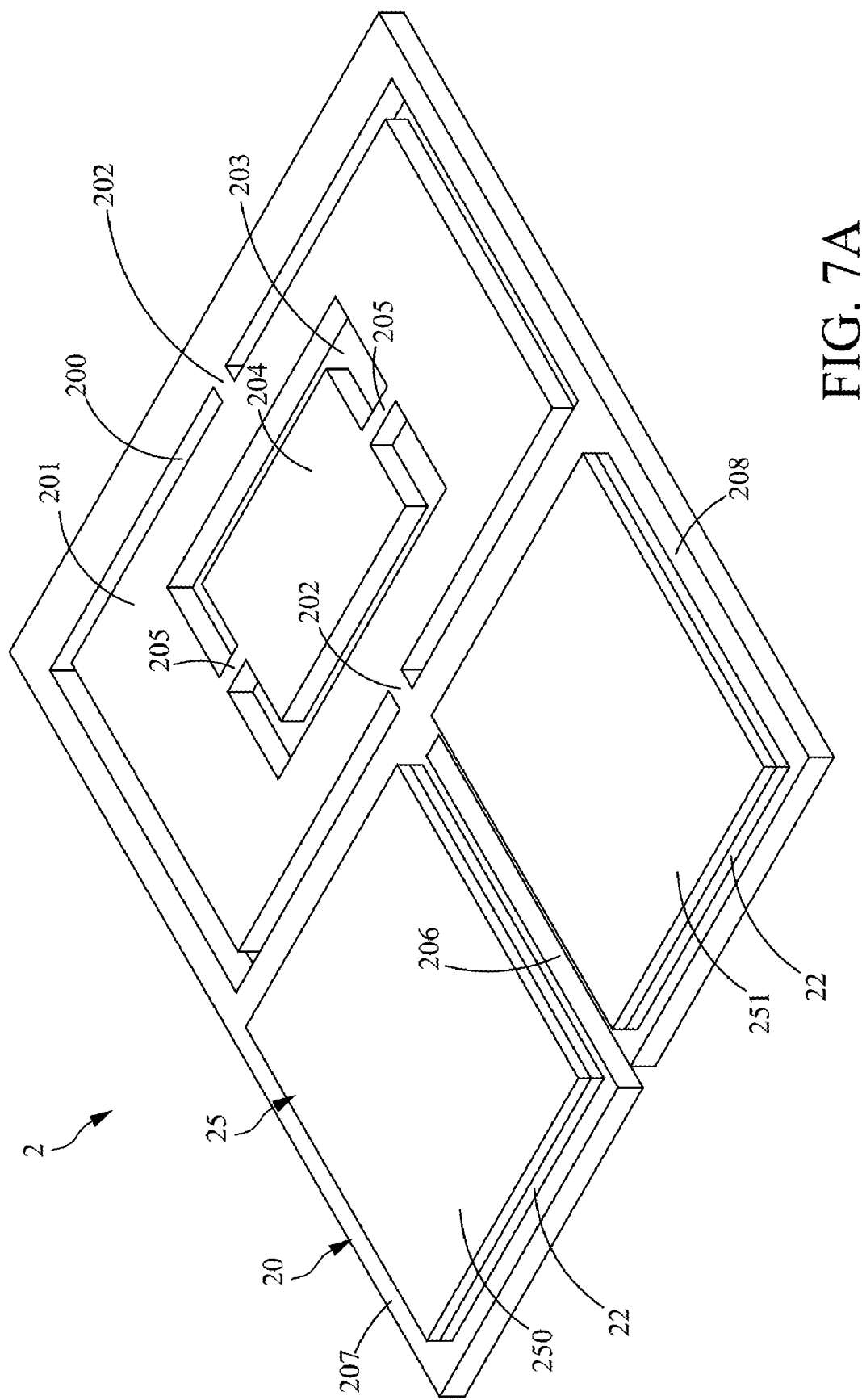
FIG. 7A and FIG. 7B is a schematic diagram showing a vibration-actuated micro mirror device according to a fourth embodiment of the present disclosure.
Figure 7B:
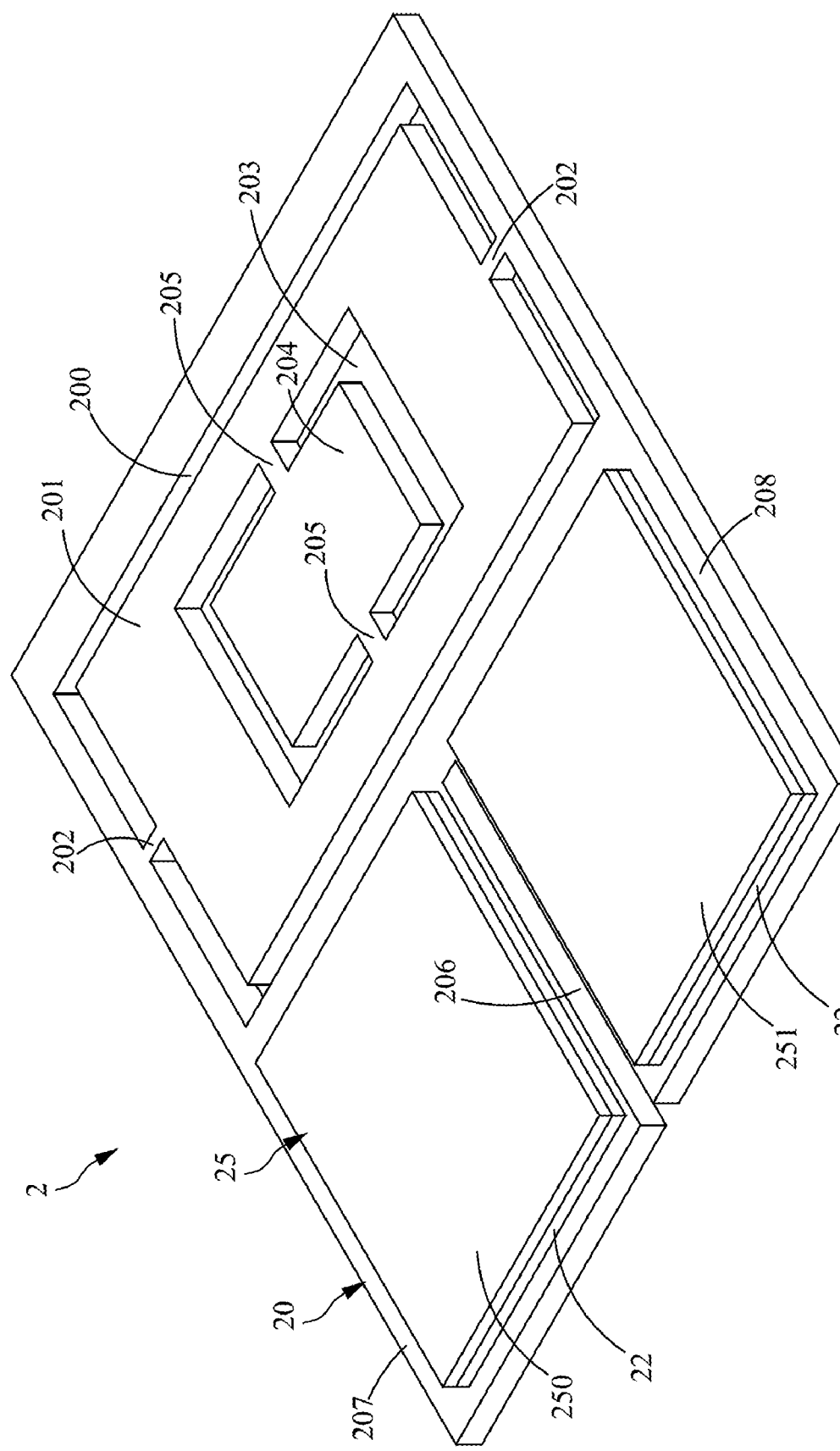

Please refer to FIG. 7A and FIG. 7B, which is a schematic diagram showing a vibration-actuated micro mirror device according to a fourth embodiment of the present disclosure. The vibration-actuated micro mirror device shown in the fourth embodiment is basically the same as the one shown in FIG. 1, but is different in that: the vibration part 25 is composed of a first vibration structure 250 and a second vibration structure 251 in a manner that the first and the second vibration structures 250, 251 are mounted directly and respectively on a first area 207 and a second area 208 that are formed at two opposite sides of a first slot 206. Thus, there is no fixing plate being used in the embodiment of FIG. 7A. Moreover, the first and the second vibration structures 211, 212 are configured to share a same grounding electrode 22, by that the amount of signal lines required can be reduced. Similarly, the first and the second vibration structures 211, 212 are also being driven to vibrate by the use of complex electric signals that are of the same phase in their respective high-frequency modes, but in opposite phase in their respective low-frequency modes, which is the same as the description for the first embodiment and thus will not be described further herein.

Although the first vibration structure 250, the second vibration structure 250 and the substrate 20 are independent components that are not integrally formed in the embodiment shown in FIG. 7A. However, they can be integrally formed as the one shown in FIG. 7B. In addition, the vibration-actuated micro mirror device shown in FIG. 7B is basically the same as the one shown in FIG. 7A, but is different in that: the first axis 202 and the second axis 205 in FIG. 7B are configured differently from those of FIG. 7A. Moreover, the first and the second vibration structures 211, 212 in the embodiment of FIG. 7B are being driven to vibrate by the use of complex electric signals different form those of the embodiment shown in FIG. 7A, which are of the same phase in their respective low-frequency modes, but in opposite phase in their respective high-frequency modes.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A vibration-actuated micro mirror device, comprising:
a substrate, configured with a swinging frame and a reflection mirror while being formed with a slot; and
a vibration part, configured with a first vibration structure and a second vibration structure in a manner that the first and the second vibration structures are disposed on the substrate respectively at two sides of the slot;
wherein, the first vibration structure has ability to receive a first driving signal so as to generate a first complex wave formed by a first wave signal and a second wave signal; and
the second vibration structure has ability to receive a second driving signal to generate a second complex wave formed by a third wave signal and a fourth wave signal;
wherein, the first wave signal and the third wave signal are formed with a same first frequency while the second wave signal and the fourth wave signal are formed with a same second frequency, and
the first and the second complex waves actuate the substrate for enabling the swinging frame to rotate about a first axis while enabling the reflection mirror to rotate about a second axis.

2. The vibration-actuated micro mirror device of claim 1, wherein the first frequency is higher than the second frequency.

3. The vibration-actuated micro mirror device of claim 1, wherein the first frequency is lower than the second frequency.

4. The vibration-actuated micro mirror device of claim 1, wherein the first wave signal and the third wave signal are formed with the same phase while the second wave signal and the fourth wave signal are formed with opposite phase.

5. The vibration-actuated micro mirror device of claim 1, wherein the first wave signal and the third wave signal are formed with opposite phase while the second wave signal and the fourth wave signal are formed with the same phase.

6. The vibration-actuated micro mirror device of claim 1, wherein the first wave signal and the third wave signal are formed with a phase difference.

7. The vibration-actuated micro mirror device of claim 1, wherein the second wave signal and the fourth wave signal are formed with a phase difference.

8. The vibration-actuated micro mirror device of claim 1, wherein the substrate is formed with a first opening while enabling a first axis, being a shaft formed on the swinging frame while protruding out from two opposite sides of the swinging frame by two first ends, to connected to two opposite inner sides of the first opening respectively by the two first ends, and the swinging frame is further formed with a second opening while enabling a second axis, being a shaft formed on the reflection mirror while protruding out from two opposite sides of the reflection mirror by two second ends, to connected to two opposite inner sides of the second opening respectively by the two second ends.

9. The vibration-actuated micro mirror device of claim 8, wherein the second axis is configured in a manner selected from the group consisting of: the second axis is aligned passing through the center of the reflection mirror, and the second axis is aligned a distance away from the center of the reflection mirror.

10. The vibration-actuated micro mirror device of claim 1, wherein the first and the second vibration structures are made of a piezoelectric material.

11. The vibration-actuated micro mirror device of claim 1, wherein the first and the second vibration structures are configured to share a same grounding electrode.

12. The vibration-actuated micro mirror device of claim 1, wherein the respective first frequency of the first and the third wave signals are larger than 15 KHz.

13. The vibration-actuated micro mirror device of claim 1, wherein the respective second frequency of the second and the fourth wave signals are smaller than 1.5 KHz.

14. The vibration-actuated micro mirror device of claim 1, wherein the first vibration structure is integrally formed with the second vibration structure.

* * * * *